United States Patent
Lin et al.

(10) Patent No.: US 6,751,474 B1
(45) Date of Patent: Jun. 15, 2004

(54) WIRELESS MODEM

(75) Inventors: Ernie Lin, North Andover, MA (US); Adolf J. Giger, Boxford, MA (US)

(73) Assignee: Nebo Wireless, LLC, North Andover, MA (US)

( * ) Notice: Subject to any disclaimer, the term of this patent is extended or adjusted under 35 U.S.C. 154(b) by 348 days.

(21) Appl. No.: 09/670,449

(22) Filed: Sep. 26, 2000

(51) Int. Cl.[7] .................................................. H04B 1/38
(52) U.S. Cl. ........................................ 455/557; 375/222
(58) Field of Search ................................ 455/557, 434, 455/464, 553, 462, 127.2, 136, 138, 177.1, 219; 375/222, 220, 235; 370/490, 494, 495

(56) References Cited

U.S. PATENT DOCUMENTS

| | | |
|---|---|---|
| 4,171,469 A | 10/1979 | Brooks |
| 4,813,073 A | 3/1989 | Ling |
| 4,835,765 A | 5/1989 | Bergmans et al. |
| 4,970,715 A | 11/1990 | McMahan |
| 5,297,203 A | 3/1994 | Rose et al. |
| 5,553,318 A | 9/1996 | Ohmagari et al. |
| 5,587,998 A | 12/1996 | Velardo, Jr. et al. |
| 5,711,012 A * | 1/1998 | Bottoms et al. ............. 455/557 |
| 5,812,537 A * | 9/1998 | Betts et al. ................. 370/286 |
| 5,926,756 A * | 7/1999 | Piosenka et al. ............ 455/418 |
| 5,930,719 A | 7/1999 | Babitch et al. |
| 5,955,921 A | 9/1999 | Ide et al. |
| 5,978,689 A * | 11/1999 | Tuoriniemi et al. ...... 455/569.1 |
| 6,072,998 A * | 6/2000 | Kaku ....................... 455/234.2 |
| 6,289,213 B1 * | 9/2001 | Flint et al. ................. 455/420 |
| 6,505,222 B1 * | 1/2003 | Davis et al. ................ 708/323 |
| 6,522,640 B2 | 2/2003 | Liebenow |

* cited by examiner

Primary Examiner—Nay Maung
Assistant Examiner—Tu Nguyen
(74) Attorney, Agent, or Firm—Fish & Richardson P.C.

(57) ABSTRACT

A modem transmits data between a computer and a telephone line. The modem features a base unit which receives a data signal from the telephone line and which transmits the data signal over a wireless link. A device receives the data signal over the wireless link and outputs an analog data signal that corresponds to the data signal. A modem card receives the analog data signal from the device, digitizes the analog data signal to produce a digital signal, demodulates the digital signal, and provides an output digital data signal to the computer.

24 Claims, 4 Drawing Sheets

WIRELESS MODEM

BACKGROUND

This invention relates to a wireless modem.

Computers typically connect to networks, such as the Internet, through a "wired" device, such as a modem. Wired, in this context, refers to wired connections, such as telephone lines, Ethernet cable, and the like.

There are limitations associated with the use of wired devices. For example, wired devices have limited portability. Also, since wired devices require a nearby telephone jack or outlet, their installation options are limited. Wireless modems have been developed to reduce the need for wired computer connections.

SUMMARY

In general, in one aspect, the invention is directed to modem circuitry for establishing a communication link between a computer and a device that receives a modulated analog data signal over a wireless link. The modem circuitry includes a coder/decoder for generating a digitized signal based on the modulated analog data signal, and a processor for demodulating the digitized signal to produce a digital data output signal.

This aspect of the invention may include one or more of the following. A three-conductor interface couples the coder/decoder to the device. The modulated analog data signal is transmitted from the device, over the three-conductor interface, to the coder/decoder. The device is a wireless telephone and the three-conductor interface is a headset interface on the wireless telephone.

The modulated analog data signal uses QAM modulation. The modulated analog data signal has substantially no nonlinear distortion and the processor performs echo canceling on the digitized signal. The modulated analog data signal is transmitted over RF using digital frequency modulation or analog frequency modulation.

In general, in another aspect, the invention is directed to a modem for transmitting data between a computer and a telephone line. This aspect of the invention features a base unit which receives a data signal from the telephone line and transmits the data signal over a wireless link. A device receives the data signal over the wireless link and outputs an analog data signal that corresponds to the data signal. A modem card receives the analog data signal from the device, digitizes the analog data signal to produce a digital signal, demodulates the digital signal, and provides an output digital data signal to the computer.

This aspect of the invention may include one or more of the following features. The modem card receives a digital signal data from the computer, generates a digitized analog signal, converts the digitized analog signal to an analog data signal, and outputs the analog data signal to the device. The device receives the analog data signal and outputs an RF signal that corresponds to the analog data signal to the base unit over a wireless link. The base unit receives the RF signal over the wireless link and outputs a data signal that corresponds to the RF signal over the telephone line. A three-conductor cable connects the modem card to the device and the modem card receives the analog data signal from the device over the three-conductor cable.

The device is a wireless telephone that is dialed manually to establish a data link between the computer and the telephone line. The base unit includes circuitry that limits an amount of nonlinear distortion in the data signal. The modem card includes circuitry that performs an echo canceling routine on the digital signal. The circuitry in the base unit includes an automatic gain controller and the circuitry in the modem card includes a processor. The echo canceling routine performed by the modem card is a linear echo canceling routine.

The base unit and the device run error detection routines to detect errors in the data signal. When an error is detected, the base unit and the device switch to a clear frequency channel, over which the data signal is transmitted. The error detection routines use a parity bit to check for errors in the data signal.

The device may be a cordless telephone handset and the base unit may be a cordless telephone base unit. Alternatively, the device may be a cellular telephone and the base unit may be a cellular base station.

In general, in another aspect, the invention is directed to a method of transmitting data from a telephone line to a computer using a modem card connected to a wireless telephone handset. The wireless telephone handset communicates with the telephone line via a base unit. The method includes establishing a connection from the computer to the telephone line via the modem card, the telephone handset, and the base unit; receiving a data signal from the telephone line at the base unit; and transmitting the data signal from the base unit to the wireless telephone handset over a wireless link. The method also includes transmitting an RF modulated voiceband data signal that corresponds to the data signal from the telephone handset to the modem; and receiving the voiceband data signal at the modem, digitizing and demodulating the voiceband data signal, and outputting a digital data signal to the computer.

Other features and advantages of the invention will become apparent from the following description, including the claims and drawings.

DESCRIPTION

Figure 1:
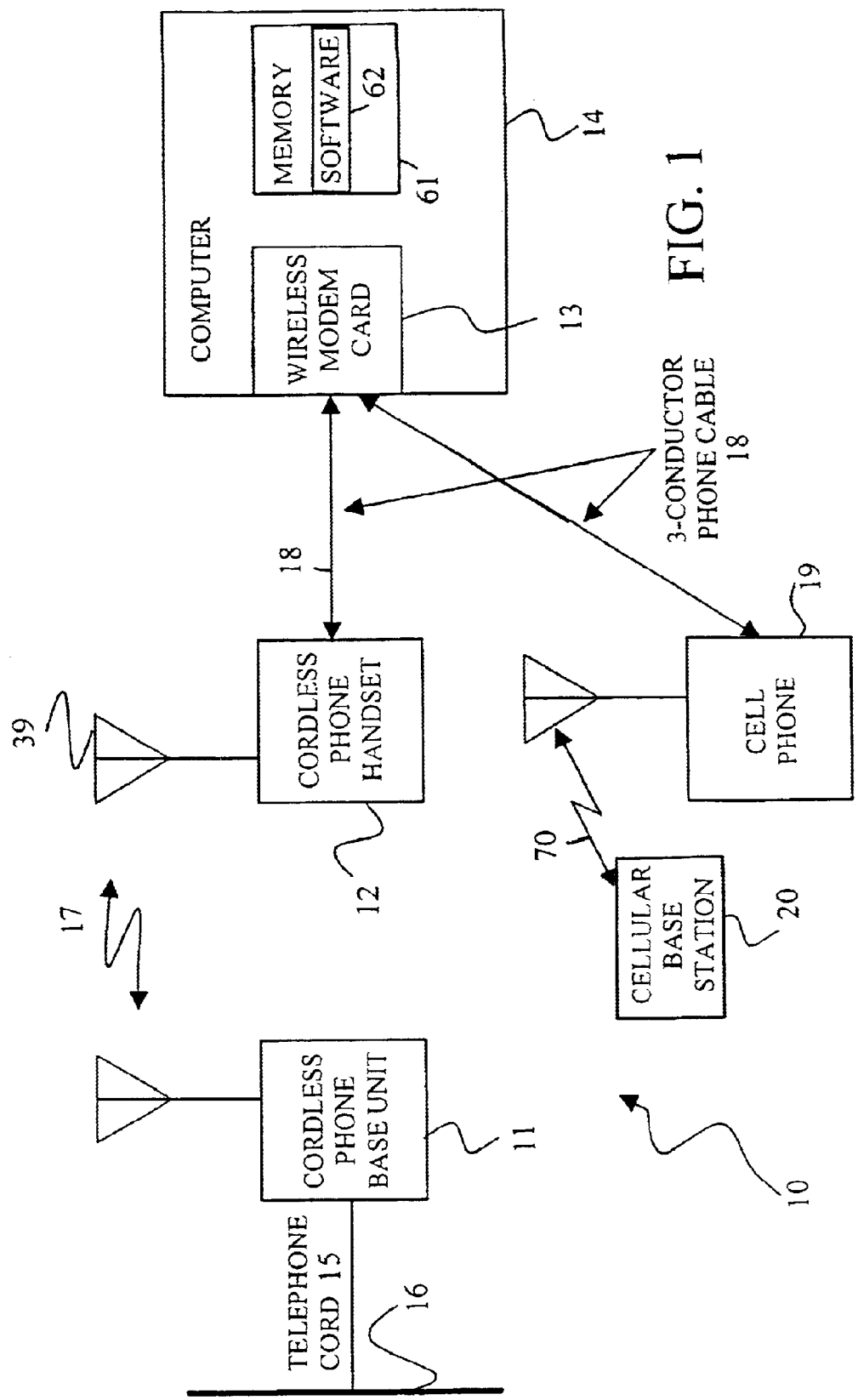
FIG. 1 is a block diagram of a wireless modem.

FIG. 1 shows a wireless modem 10. Wireless modem 10 includes wireless modem card 13 (i.e., wireless modem circuitry) and a wireless interface device. The wireless interface device may be a cordless telephone handset 12, such as a conventional 900 MHz (MegaHertz) home telephone, or a cellular telephone 19.

Wireless modem card 13 interfaces to computer 14 allowing computer 14 to transmit/receive data over a telephone line via the wireless interface device. Computer 14 may be any type of processing device, such as a laptop computer, a desktop personal computer (PC), or a handheld computer, such as a PalmPilot®. Wireless modem card 13 may be a PCMCIA (Personal Computer Memory Card International Association), PC card, PCI (Peripheral Component Interconnect) card, or any other type of suitable computer interface board.

Cordless Telephone Interface

Where the wireless interface device is a cordless telephone handset 12, a base unit 11 connects to the Public Switched Telephone Network (PSTN) through a two-wire telephone cord 15 plugged into a telephone wall jack 16. Communication (i.e., data exchange) between base unit 11 and handset 12 is via a radio frequency (RF) link 17. RF link 17 transmits the standard "voiceband" frequencies contained in the roughly three-kilohertz (kHz) band extending from 0.3 to 3.4 kHz.

Thus, data signals used in wireless modem 10 are transmitted between base unit 11 and handset 12 via the wireless telephone channel RF link. The range of this RF link may vary, but it is typically several hundred feet or longer. The data signals are transmitted between cordless telephone handset 12 and wireless modem card 13 via a three-conductor cable 18.

Three-conductor cable 18 is a feature on cordless telephone handset 12 that is used to connect to a "hands-free" headset (not shown). Three-conductor cable 18 operates as a 4-wire circuit by separately carrying two voiceband analog data signals traveling in opposite directions, i.e., "from wireless modem card 13" and "to wireless modem card 13". This is possible because one of the wires is a shared ground, as shown in FIG. 2 below.

By connecting wireless modem card through the three-conductor cable of a wireless telephone, it is possible to transmit analog data signals that have been generated in accordance with standard voiceband modulation techniques (according to ITU recommendations V.90, V.34 etc.) to and from wireless modem card 13. These analog data signals can then be converted to digital data signals and vice versa in wireless modem card 13 to provide a relatively high rate, e.g., 56 kbps (kilobits per second), data transfer. In contrast, conventional cellular telephone modems require transmission of digital data signals using specialized telephone circuitry that limits the rate of the data transfer to, at most, 19.2 kbps.

Wireless Modem Card

Figure 2:
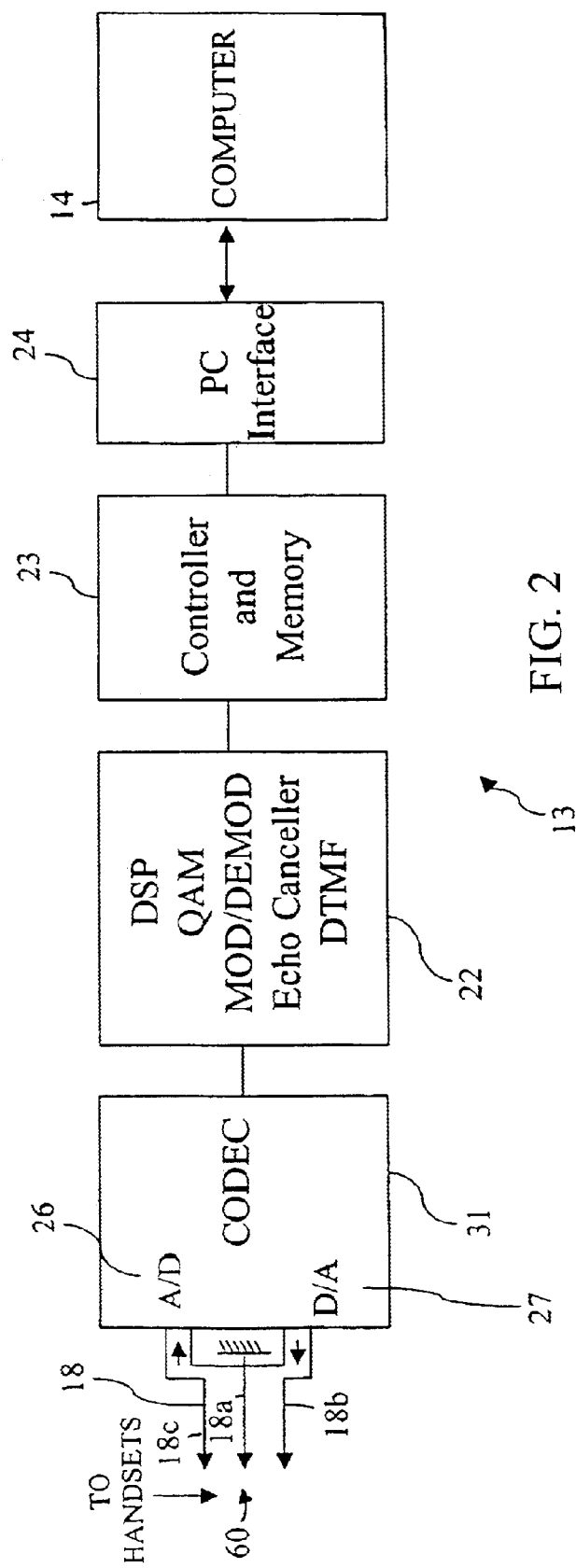
FIG. 2 is a block diagram of a wireless modem card used in the wireless modem.

FIG. 2 shows circuitry included on wireless modem card 13. As noted, the telephone interface is a three-conductor cable 18. One of the three conductors 18a is a common ground wire. Conductors 18b and 18c, respectively, carry analog data signals to and from a telephone handset, such as cordless handset 12 or cellular telephone 19.

These analog data signals are passed through a coder/decoder (codec) 31, where they are converted between analog and digital form to facilitate efficient and precise signal processing, using techniques such as analog data modulation and demodulation.

Analog data signals coming from the telephone handset are converted by modem card 13 to digital form for transmission to computer 14. Digital signals originating from computer 14 are converted by codec 31 to analog form for transmission via the wireless telephone. Accordingly, codec 31 includes an A/D (analog-to-digital) converter 26 for converting an incoming analog data signal on conductor 18c to digital form, and a D/A (digital-to-analog) converter 27 for converting an outgoing digital data signal on conductor 18b to analog form. Codec 26 also includes buffer amplifiers (not shown) for managing data transmission.

Wireless modem card 13 also includes a digital signal processor (DSP) 22. DSP 22 performs various functions, including QAM (quadrature amplitude modulation) modulation and demodulation, echo cancellation, and generation and detection of DTMF (dual tone multi-frequency or touchtone) dialing and other tones.

QAM modulation is a method for encoding digital data into analog data signals. QAM demodulation is a method of changing QAM-modulated analog data into digital data signals. The analog data signals sent to wireless modem card 13 from cordless telephone handset 12 or cellular telephone 19 are QAM modulated. These QAM-modulated data signals are digitized by codec 31 and then QAM-demodulated by DSP 22. DSP 22 also performs QAM modulation on digital data signals that are being sent from computer 14 to the PSTN. Up to 1024 QAM states may be used during QAM modulation and demodulation.

Regarding echo cancellation, mismatched impedances in hybrid circuitry 41 of FIG. 4 (described below) produce an echo coming from cordless telephone handset 12. In normal telephone service, this echo simply adds to deliberately generated sidetone energy. In telephone communications, sidetone energy is necessary so that the speaker can hear his own voice and thus determine how loudly to speak. For modem operation, however, sidetone energy and/or reflections from the central office are detrimental. Significant elimination of the unbalanced signal is preferred for modems to operate in full duplex mode, i.e., to transmit and receive simultaneously on the same frequency over the same two wires.

DSP 22 performs linear echo cancellation, according to well-known techniques, by generating a replica of the echo from the transmitted signal and canceling the echo using the replica. Descriptions of echo canceling techniques that may be used in modem 10 are found in U.S. Pat. Nos. 4,813,073, 4,835,765, 4,970,715, and 5,587,998. The echo canceling routine running in DSP 22 includes a 128 tap delay line whose tap weights are set by a training sequence applied before full data transfer begins. Wireless modem card 13 also includes controller 23, which may be a microprocessor. Controller 23, using software programs stored in its associated memory, performs many of the control functions required in wireless modem card 13. Wireless modem card 13 connects to computer 14 through a conventional multi-pin connector.

Computer 14 contains a memory 61 (FIG. 1) that stores software 62, such as drivers and the like, to operate wireless modem 10. This software is described below.

Cordless Telephone Handset

Figure 3:
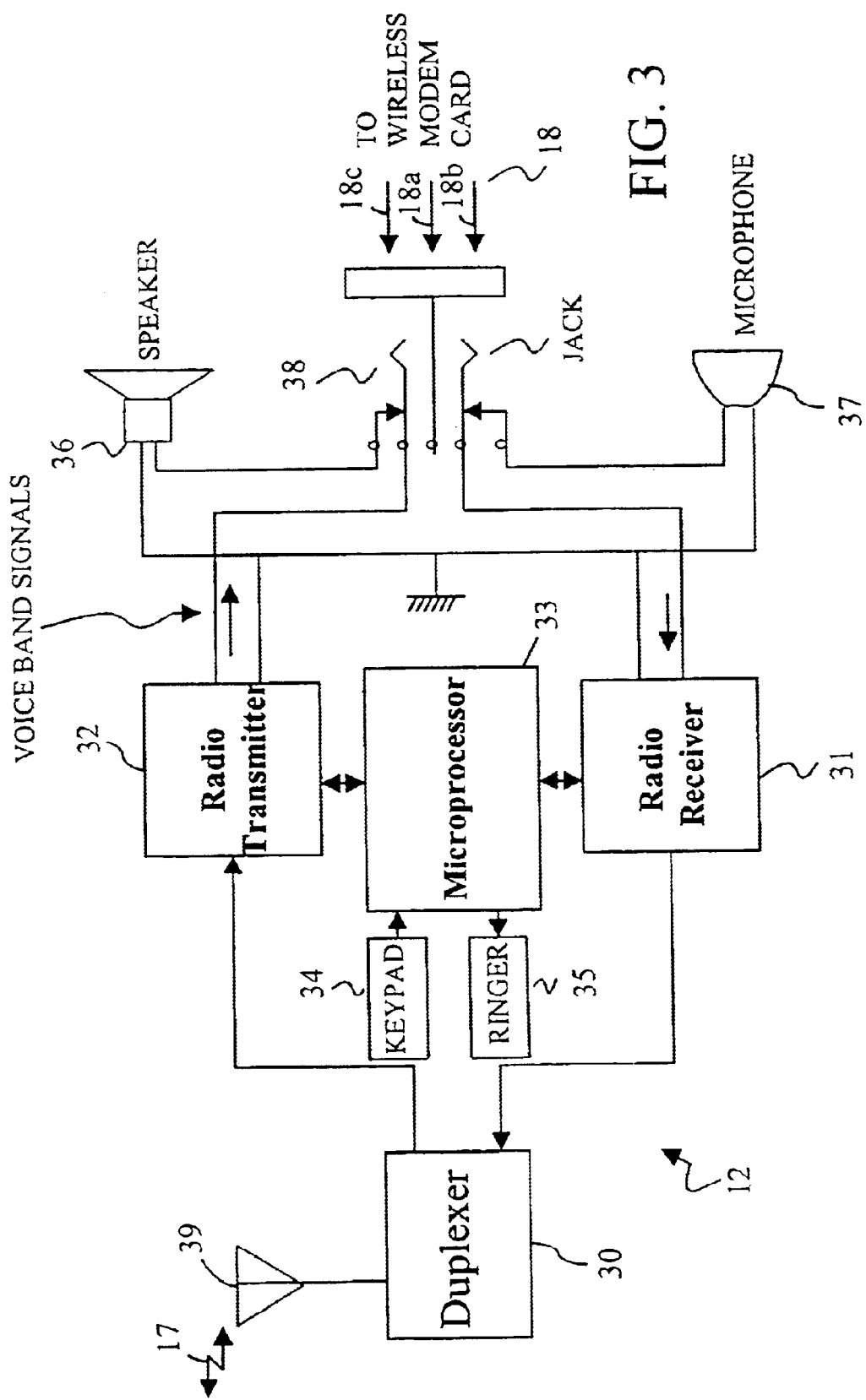
FIG. 3 is a block diagram of a handset for a cordless telephone used with the wireless modem.

FIG. 3 shows a block diagram of circuitry in cordless telephone handset 12. This circuitry includes an antenna 39 for receiving data signals over an RF link 17 from base unit 11 and for transmitting data signals to base unit 11 over the RF link. A duplexer 30 in handset 12 separates RF signals traveling in opposite directions (to/from base unit 11) by virtue of their different channel frequencies and connects them to either a radio receiver 31 or a radio transmitter 32 in handset 12.

Handset 12 includes a microprocessor 33 that controls its operation and that receives signals from a keypad 34 and interface with ringer 35. Microprocessor 33 also communicates with a microprocessor 44 in base unit 11 (FIG. 4) over RF link 17. Radio receiver 31 sends an incoming analog data signal to wireless modem card 13 when three-conductor cable 18 is interfaced to a jack 38 on handset 12. If three-conductor cable 18 is not interfaced to jack 38, the analog voice signal is output via speaker 36. Analog data signals that originate from wireless modem card 13 (or from microphone 37, if three-conductor cable 18 is not interfaced to jack 38) are output to base unit 11 via radio transmitter 32.

Cordless Telephone Base Unit

Figure 4:
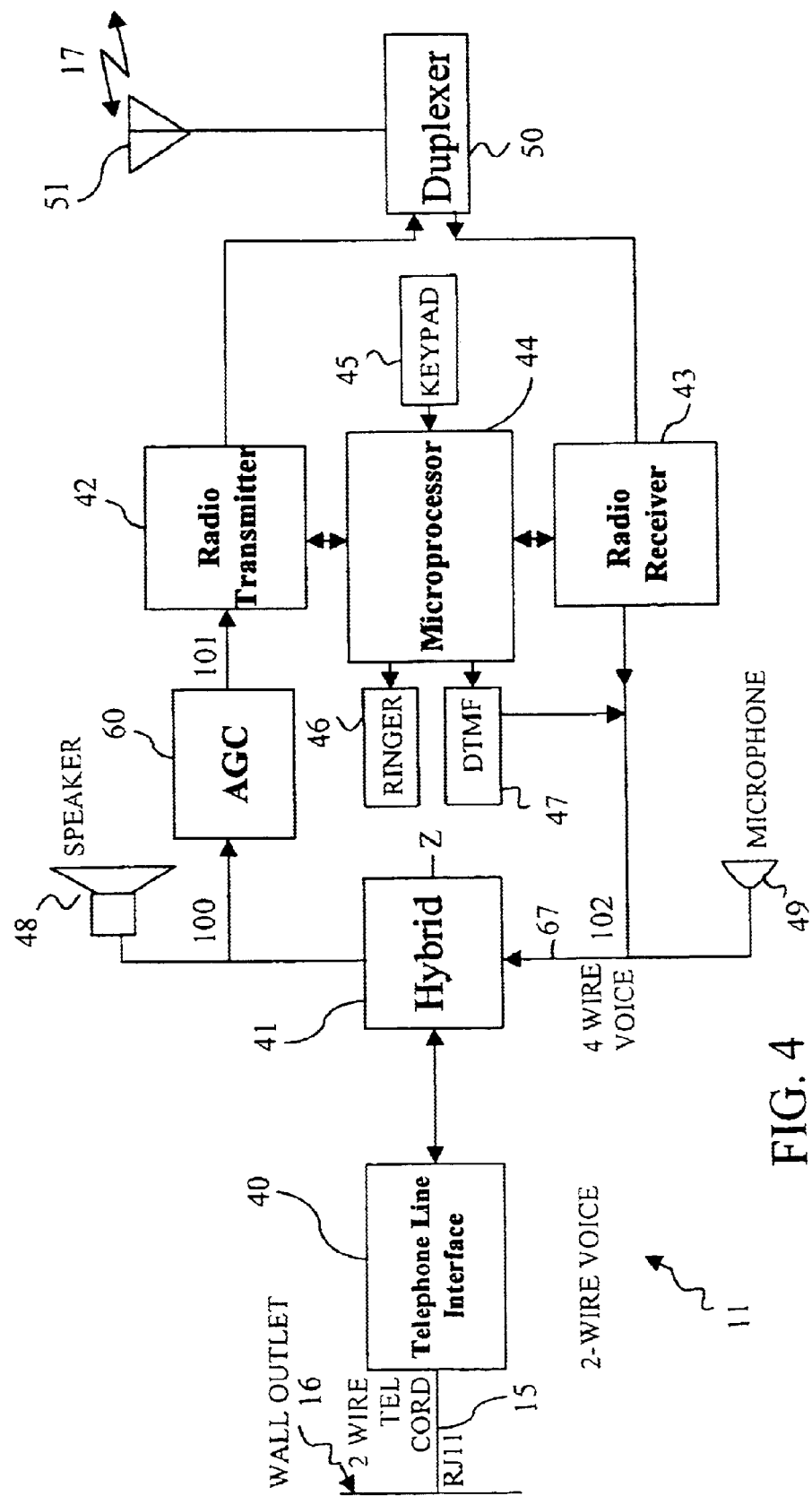
FIG. 4 is a block diagram of a base unit for the cordless telephone used with the wireless modem.

FIG. 4 shows a block diagram of base unit 11. The two circuits of base unit 11 that are nearest to the PSTN are telephone line interface 40 and hybrid circuit 41. Telephone line interface 40, also called a Data Access Arrangement or "DAA", connects through cord 15, wall outlet 16, and a twisted-pair telephone line to the equipment in a telephone central office (not shown).

Interface 40 includes an electronic ring detector, overvoltage protection, polarity protection, an electronic hook switch, an electronic loop DC (Direct Current) holding circuit, and a transformer providing additional protection from transients on the telephone line. A description of the circuitry included in interface 40 is found in U.S. patent application Ser. No. 09/658,049, entitled "Wireless Modem", filed on Sep. 8, 2000 in the names of Ernie H. Lin and Adolf J. Giger, the contents of which are incorporated herein by reference.

Hybrid circuit 41, which includes a resistive hybrid circuit and operational amplifiers, is used to convert from two-wire to four-wire telephone operation. More specifically, the function of hybrid circuit 41 is to separate the two signals flowing in opposite directions in the two-wire telephone line from the telephone central office and make the signals available at two distinct terminals (4 wires) 66 and 67. An incoming analog data signal is received at hybrid terminal 66 and an outgoing analog data signal is applied to hybrid terminal 67.

Hybrid circuit 41 is a bridge circuit; therefore, separation of the two signals at terminals 66 and 67 is achieved if all the impedances connected to the bridge circuit are matched. In practice, a considerable mismatch will exist, which causes the signal applied to terminal 67 to be reflected from the central office and leak into terminal 66. This results in an echo (noted above) being added to the incoming signal, causing the amplitude of the resulting combined signal, meaning the original signal plus echo, to possibly be several times the amplitude of the desired amplitude.

The combined signal 100 can cause overload and nonlinear distortion in radio transmitter 42. Echoes that have been corrupted by nonlinear distortion cannot be effectively eliminated by linear echo canceling routines. To reduce overload and nonlinear distortion an AGC circuit 60 is included in base unit 11. AGC circuit 60 includes a peak amplitude detector that keeps the peak amplitude of the combined signal 101 constant and within the linear amplification region of radio transmitter 42. Since. nonlinear distortions have been reduced, the linear echo canceling routines noted above can be used in wireless modem card 13. That is, the echo is cancelled by generating a replica of the echo from the transmitted signal and using the replica to cancel the echo.

Imperfect echo can cancellation and/or other transmission impairments will likely cause transmission errors. This may cause wireless modem card 13 to revert to half duplex operation, to reduce data transmission speed (e.g. from 56 kbps to as low as 4.8 kbps), and/or to initiate an automatic request for retransmission of the data signal.

Signal 100 is output to speaker 48 and resulting AGC-corrected signal 101 is output to radio transmitter 42 for transmission to remote handset 12. Terminal 67 receives voiceband signal 102 from either local microphone 49 or radio receiver 43 for transmission to the telephone office.

Radio transmitter 42 translates an analog data signal to a modulated RF signal and radio receiver 43 translates a modulated RF signal to an analog data signal. Radio transmitter 42 and radio receiver 43 operate on different frequencies and are connected to common antenna 51 through duplexer 50.

Antenna 51 transmits/receives modulated RF signals to/from cordless telephone handset 12. The RF signals may be modulated by radio transmitter 42 using a variety of techniques, ranging from analog FM (frequency modulation) to digital FM, such as frequency shift keying (FSK) and spread spectrum techniques.

RF Signal Transmission Techniques

If digital FM modulation (FSK) is used for the RF signal, circuitry (not shown) in radio transmitter 42 performs the following functions. The analog data signal is digitized using an analog-to-digital (A/D) converter. This signal is then scrambled and applied to a modulator, in this case, an FM deviator, whose output frequency is translated to a final RF frequency using mixers and local oscillators. Local oscillator signals in both the radio transmitter and receiver are generated using frequency synthesizers. The frequencies of these signals can be tuned to a desired RF channel at the instruction of microprocessor 44. One example of an RF transmission method that may be used is described in U.S. Pat. No. 5,297,203 (Rose, et al.), which is incorporated herein by reference.

The transmission method described in Rose, et al. uses FSK modulation and a channel bandwidth of 100 kHz. There are 20 RF channels available, using the frequency band 905.6–907.5 MHz for transmission in one direction (e.g., to cordless handset 12), and the frequency band 925.5–927.4 MHz for transmission in the other direction (e.g., from cordless handset 12). Before being applied to the FM deviator, the analog data signal is first digitized using Adaptive Delta Modulation (ADM), resulting in a bit rate of approximately 48 kbps. Using these techniques, the resulting digital signal has relatively low quantizing noise, leading to relatively high-quality data transmission.

In general, if digital transmission over the RF channel is chosen, before being applied to the A/D converter, the analog data signal should be adjusted to have a fixed peak power by using AGC circuit 60. The converter then samples at a rate of 8000 per second and performs eight-bit linear PCM (pulse-code-modulated) encoding. This results in a 64 kbps PCM rate.

If analog FM is used to modulate the RF signal, the analog data signal is directly applied to an FM deviator in radio transmitter 42. Analog FM RF transmission provides a stable channel having a baseband gain that is relatively unaffected by variable RF signal levels. Analog FM RF transmission also has good linearity, no quantization noise, and has a relatively soft overload characteristic, which keeps nonlinear signal distortions relatively low.

Referring back to FIG. 4, microprocessor 44 controls the functions of base unit 11 and interacts with telephone line interface 40, radio transmitter 42, radio receiver 43, keypad 45, DTMF circuit 47 and ringer 46. Microprocessor 44 is also responsible for sending/receiving control signals to/from remote handset 12.

In the case of interference from other cordless telephones, several techniques are available to reduce the interference. One technique is to change the operating frequency of base unit 11 by pushing a (frequency) "SCAN" (or "CHANNEL") button when a user detects interference. Another technique is to use a cordless telephone whose RF frequency is changed automatically when the telephone itself, with built-in error detection, detects unacceptable transmission errors. In this type of telephone, the decision to change the channel frequency is made under control of microprocessors 33 and 44 and may be based on an error rate measurement in the RF channel. When an error is detected by either microprocessor, that information is shared with the other microprocessor. The two microprocessors then agree on a new frequency channel over which to exchange the data.

One method that may be used for error detection, if digital RF transmission is used, includes adding a parity bit in a group of 48 regular bits from, for instance, a 48 Kbps bit stream and using the parity bit to detect errors in the data signal. The parity bit could be the least significant bit taken from an eight-bit PCM sample once every 6 samples. In any case, any error detection scheme that does not incur a significant degradation in data transmission may be used. If analog RF transmission is used, an extra bit stream could be transmitted in an audio sub-band between 100 and 200 Hz and the errors again measured using parity bits.

Cellular Telephone Interface

Where the wireless interface device is cellular telephone 19 (FIG. 1), cellular telephone 19 communicates analog voiceband signals over an RF link 70 to a cellular base station 20. Cellular base station 20 connects to the PSTN. Voiceband analog data may also be transmitted to the base station over conventional cellular channels.

The connection to wireless modem card 13 is the same as that for a cordless telephone described above. That is, analog data signals are sent from cellular telephone 19 to wireless modem card 13 via a three-conductor cable 18. Three-conductor cable 18 is a feature on cellular telephone 19 that is used to connect a "hands-free" headset (not shown) to telephone 19. Three-conductor cable 18 operates as a 4-wire circuit, in the same manner as above, by separately carrying two analog data signals traveling in opposite directions.

Cellular radio transmissions are either by analog RF modulation as used in AMPS (Advanced Mobile Phone System) and NAMPS (Narrowband Advanced Mobile Phone System), or by digital RF modulation such as TDMA (Time Division Multiple Access), CDMA (Code Division Multiple Access) or GSM (Global System for Mobile Communication).

All the digital methods use speech compression, compressing a high-quality bit stream of 64 kbps, representing high quality speech, down to as low as 8 kbps. This compression is detrimental to the transmission of a high-speed data signal, resulting in reduced data rates. Analog cellular transmission has no such limitations, and, therefore, is the preferred mode for the wireless modem described here. With a high-quality analog cellular telephone connection, it is possible to transmit data over wireless modem 10 at rates as high as of 56 kbps or higher.

Modem Software In The Computer

One of the features of wireless modem 10 is that wireless modem 10 does not "dial-out" from computer 14 directly. Accordingly, modem software 62 located in computer 14 is configured to allow manual dialing using the keypads of the cellular telephone or the cordless telephone.

To use a standard wired modem, a user initiates a software program in the computer. The program drives the modem to turn on an "off-hook" switch to obtain a dial tone. It then dials the telephone number of an Internet Service Provider (ISP) and turns the modem into a "ready to receive" state. When a dialed party, in this case a modem at a remote ISP site, receives the call, it sends back a tone to initiate a handshake with the dialing party, which is in the "ready to receive" state. The two parties then negotiate all the necessary protocols, including the transmission speed, to establish the communications.

For wireless modem 10, software 62 in computer 14 skips the steps of turning on the "off-hook" switch and dialing the telephone number of an ISP. Instead, software 62 turns computer 14 and wireless modem 10 into a "ready to receive" state. A user then, in the case of a cordless handset, initiates the off-hook condition by pushing, e.g., a "PHONE" button and manually dialing the telephone number of an ISP. In the case of the cellular telephone, a user dials the number of the ISP followed by pushing, e.g., a "SEND" key.

After a modem at the dialed location receives the call, that modem sends back a modem tone and causes wireless modem card 13 and PC 14 to complete a "handshake" and establish communications. At the end of the modem session, the telephone connection is terminated manually by pushing the OFF button on the cordless handset or, e.g., an "END" key on the cellular telephone.

The invention is not limited to the hardware and software configurations shown in FIGS. 1 to 4. The circuitry in wireless modem 10 may be implemented in hardware (e.g., one or more discrete components, ASICs {Application-Specific Integrated Circuit} and/or FPGAs {Field Programmable Gate Array}), software, or a combination of hardware and software.

The invention is also not limited to transmitting data over the RF frequency bands described above, or to the specific modulation and encoding techniques described herein. Techniques and/or transmission methods other than those described above may be used.

Likewise, the invention is not limited to use with the specific protocols or standards noted herein. The invention can also be used with any wireless communication device, and is not limited specifically to cordless and cellular telephones.

Other embodiments not described herein are within the scope of the following claims.

What is claimed is:

1. Modem circuitry for establishing a communication link between a computer and a device that receives a modulated analog data signal over a wireless link, the modem circuitry comprising:

a coder/decoder for generating a digitized signal based on the modulated analog data signal, the coder/decoder including a three-conductor interface to a three-conductor cable over which all signals are exchanged with the device, the three-conductor cable comprising a first conductor to transmit signals to the device that are destined for a network, a second conductor to receive signals from the device, and a third conductor that acts as a shared ground for the first conductor and the second conductor; and a processor for demodulating the digitized signal to produce a digital data output signal.

2. The modem circuitry of claim 1, wherein the device comprises a wireless telephone and the three-conductor interface comprises a headset interface on the wireless telephone.

3. The modem circuitry of claim 1, wherein modulated analog data signal uses QAM modulation.

4. The modem circuitry of claim 1, wherein:

the modulated analog data signal has substantially no nonlinear distortion; and the processor performs echo canceling on the digitized signal.

5. The modem circuitry of claim 1, wherein the modulated analog data signal is transmitted over RF using digital frequency modulation.

6. The modem circuitry of claim 1, wherein the modulated analog data signal is transmitted over RF using analog frequency modulation.

7. A modem for transmitting data between a computer and a telephone line, comprising:

a base unit which receives a data signal from the telephone line and which transmits the data signal over a wireless link;

a device which receives the data signal over the wireless link and which outputs an analog data signal that corresponds to the data signal; and a modem card which receives the analog data signal from the device, digitizes the analog data signal to produce a digital signal, demodulates the digital signal, and provides an output digital data signal to the computer, the modem card including a three-conductor cable interface for a three-conductor cable over which all signals are transmitted between the device and the modem card, the three-conductor cable comprising a first conductor to transmit signals to the device that are destined for a network, a second conductor to receive signals from the device, and a third conductor that acts as a shared ground for the first conductor and the second conductor.

8. The modem of claim 7, wherein the modem card receives a digital data signal from the computer, generates a digitized analog signal, converts the digitized analog signal to an analog data signal, and outputs the analog data signal to the device;

the device receives the analog data signal and outputs an RF signal that corresponds to the analog data signal to the base unit over a wireless link; and the base unit receives the RF signal over the wireless link and outputs a data signal that corresponds to the RF signal over the telephone line.

9. The modem of claim 7, wherein the modem card receives the analog data signal from the device over the three-conductor cable.

10. The modem of claim 7, wherein the device comprises a wireless telephone that is dialed manually to establish a data link between the computer and the telephone line.

11. The modem of claim 7, wherein:

the base unit comprises circuitry which limits an amount of nonlinear distortion in the data signal; and the modem card comprises circuitry which performs an echo canceling routine on the digital signal.

12. The modem of claims 11, wherein the circuitry in the base unit comprises an automatic gain controller and the circuitry in the modem card comprises a processor.

13. The modem of claim 11, wherein the echo canceling routine performed by the circuitry in the modem card comprises a linear echo canceling routine.

14. The modem of claim 7, wherein:

the base unit and the device run error detection routines for detecting an error in the data signal; and when an error is detected in the data signal, the base unit and the device switch to a clear frequency channel over which the data signal is transmitted.

15. The modem of claim 14, wherein the error detection routines use a parity bit to check for the error in the data signal.

16. The modem of claim 7, wherein the device comprises a cordless telephone handset and the base unit comprises a cordless telephone base unit.

17. The modem of claim 7, wherein the device comprises a cellular telephone and the base unit comprises a cellular base station.

18. A method of transmitting data from a telephone line to a computer using a modem card connected to a wireless telephone handset, the wireless telephone handset communicating with the telephone line via a base unit, the method comprising:

establishing a connection from the computer to the telephone line via the modem card, the telephone handset, and the base unit;

receiving a data signal from the telephone line at the base unit;

reducing overload and nonlinear distortion in the data signal using an automatic gain control circuit located in the base unit to keep a peak amplitude of the data signal in a predetermined linear amplification region;

transmitting the data signal from the base unit to the wireless telephone handset over a wireless link;

transmitting an RF modulated voiceband data signal that corresponds to the data signal from the telephone handset to the modem; and receiving the voiceband data signal at the modem, digitizing and demodulating the voiceband data signal, and outputting a digital data signal to the computer.

19. A modem for transmitting data between a computer and a telephone line, comprising:

a base unit which receives a data signal from the telephone line and which transmits the data signal over a wireless link, the base unit including an automatic gain control circuit which reduces overload and nonlinear distortion in the data signal by keeping a peak amplitude of the data signal in a predetermined linear amplification region;

a device which receives the data signal over the wireless link and which outputs an analog data signal that corresponds to the data signal; and a modem card which receives the analog data signal from the device, digitizes the analog data signal to produce a digital signal, demodulates the digital signal, and provides an output digital data signal to the computer.

20. The modem of claim 19, wherein the modem card includes a coder/decoder that digitizes the analog data signal to produce the digital signal.

21. The modem of claim 20, wherein the coder/decoder comprises:

a three-conductor interface to a three-conductor cable over which all signals are exchanged with the device, the three-conductor cable comprising a first conductor to transmit signals to the device, a second conductor to receive signals from the device, and a third conductor that acts as a shared ground for the first conductor and the second conductor.

22. The modem of claim 19, wherein the device comprises a wireless telephone that is dialed manually to establish a data link between the computer and the telephone line.

23. The modem of claim 19, wherein the modem card comprises circuitry which performs an echo canceling routine on the digital signal.

24. The modem of claim 23, wherein the echo canceling routine performed by the circuitry in the modem card comprises a linear echo canceling routine.

* * * * *